United States Patent [19]
Leturmy

[11] Patent Number: 5,569,075
[45] Date of Patent: Oct. 29, 1996

[54] GAS INJECTION APPARATUS AND PROCESS TO FORM A CONTROLLED ATMOSPHERE IN A CONFINED SPACE

[75] Inventor: Marc Leturmy, Garanciere, France

[73] Assignee: L'Air Liquide, Societe Anonyme pour l'Etude et l'Exploitation des Procedes Georges Claude, Paris Cedex, France

[21] Appl. No.: 361,534

[22] Filed: Dec. 22, 1994

[30]     Foreign Application Priority Data

Dec. 22, 1993 [FR] France ................... 93 15503

[51] Int. Cl.$^6$ ............................................. B23K 31/02
[52] U.S. Cl. ........................... 454/66; 228/219; 454/187
[58] Field of Search ........................... 228/219, 220; 454/44, 60, 306, 66, 187

[56]         References Cited

U.S. PATENT DOCUMENTS

| | | | |
|---|---|---|---|
| 3,597,833 | 8/1971 | Frederick et al. | 228/219 X |
| 4,580,716 | 4/1986 | Barresi et al. | 228/219 |
| 5,161,727 | 11/1992 | Leturmy et al. | 228/37 |
| 5,203,489 | 4/1993 | Gileta et al. | 228/219 |
| 5,364,007 | 11/1994 | Jacobs et al. | 228/219 X |
| 5,393,948 | 2/1995 | Bjorkman, Jr. | 228/219 X |

FOREIGN PATENT DOCUMENTS

| | | | |
|---|---|---|---|
| 2670986 | 6/1992 | France . | |
| 676270 | 5/1939 | Germany . | |
| 2046895 | 1/1972 | Germany . | |
| 3434669 | 4/1986 | Germany . | |
| 10930 | 3/1971 | Japan | 228/219 |
| 95854 | 8/1978 | Japan | 228/219 |
| 142065 | 6/1991 | Japan | 228/219 |
| WO92/10323 | 6/1992 | WIPO . | |

*Primary Examiner*—Harold Joyce
*Attorney, Agent, or Firm*—Young & Thompson

[57]         ABSTRACT

A gas injection apparatus and process to form a controlled atmosphere in a confined space, comprising at least one assembly of ducts installed in series and/or in parallel, of which at least a part (2, 12, 13) of a duct comprises gas injection apertures. The assembly is supplied by at least one gas supply main (9, 14, 15), each main being connected to the assembly at the level of a primary connection node (8, 16, 17), the dimensions of the assembly observing the following relationship:

$$\Sigma\omega_i/\Sigma\phi_i \geq 1, \text{ preferably } \geq 1.5;$$

wherein $\Sigma\omega_i$ represents the sum of internal sections of the gas supply mains feeding the assembly and $\Sigma\phi_i$ represents the sum of the cross-sections of the gas injection apertures of the ducts assembly.

21 Claims, 2 Drawing Sheets

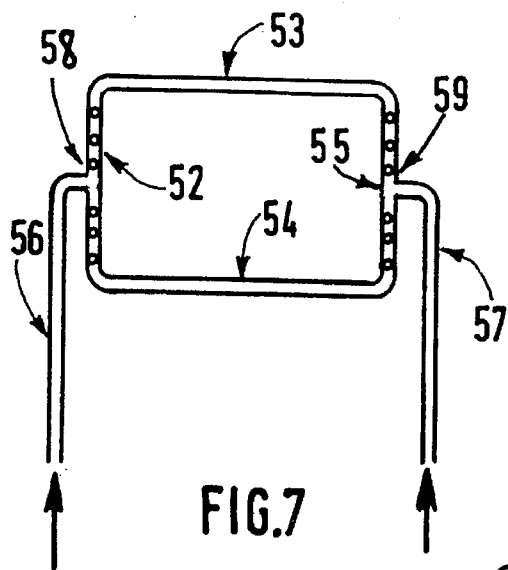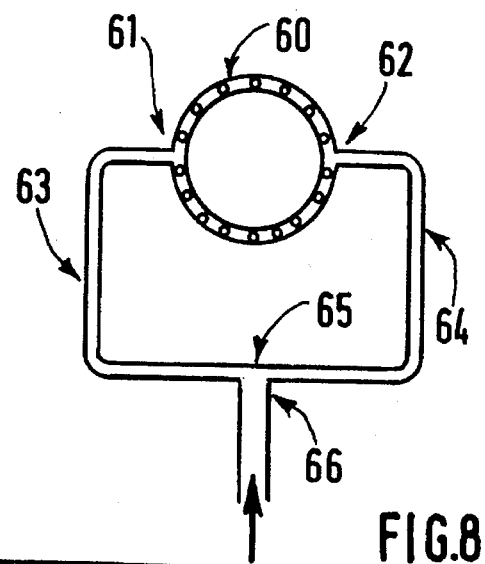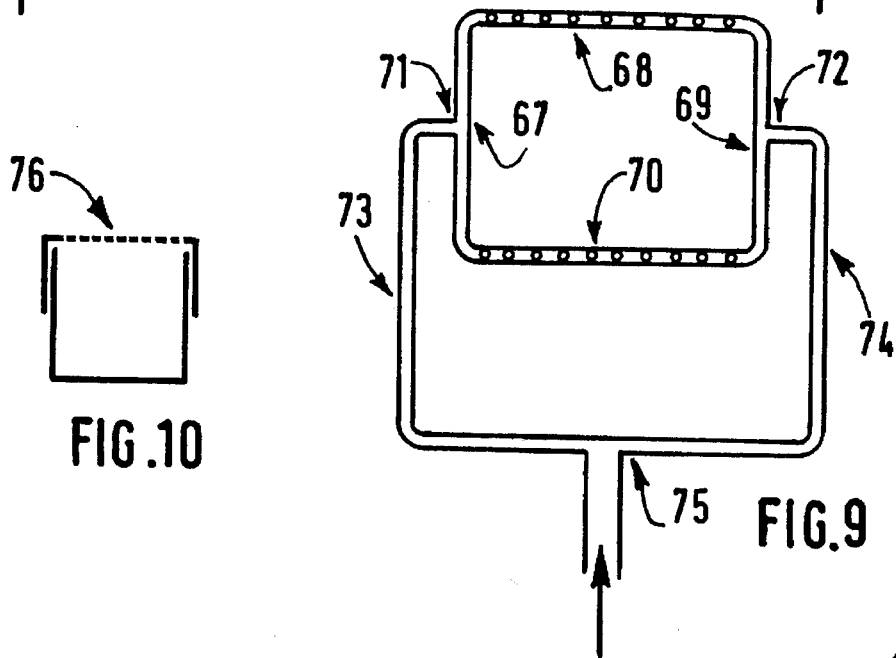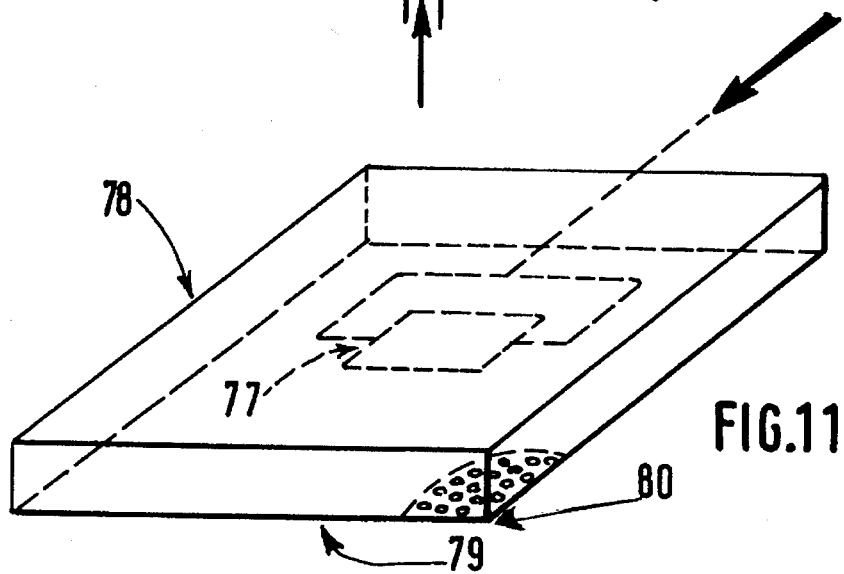

GAS INJECTION APPARATUS AND PROCESS TO FORM A CONTROLLED ATMOSPHERE IN A CONFINED SPACE

FIELD OF THE INVENTION

This invention concerns a gas injection apparatus and process to form a controlled atmosphere in a confined space. It applies more particularly in cases where it is required to install a controlled atmosphere (whether inert or active) in one or several zones of a wave soldering machine or in all or part of a continuous furnace used for applications such as soldering (hard or soft as in electronics), or again for annealing, stress-relieving, sintering or whatsoever other heat treatments.

BACKGROUND OF THE INVENTION

Taking wave soldering machines as an example, these serve traditionally in the soldering of electronic components on circuits (whether components inserted in the circuit or components surface mounted on the circuit), as well as for tinning electronic component connections and even for brazing contact strips onto electronic supports such as hybrid circuits.

The design of these machines is such that components to be brazed or tin-coated are brought into contact with one or several waves of molten solder obtained by means of pumping through a jet, the solder bath contained in a vat.

Initially the circuits (on which components have been reported) or components to be tin-coated will generally have been fluxed in an upstream area of the machine, mainly so as to deoxidize the metal surfaces to facilitate their eventual wetting by the solder, the fluxing operation being followed by a so-called pre-heating operation, carried out to activate the fluxes previously deposited on the circuit or component, and to preheat the circuits or components before they arrive in the soldering hot zone. Application of such a chemical flux usually gives rise to the need after brazing or tin-plating for the user to proceed with a product cleaning operation, frequently with the aid of chlorinated solvents, ensuring the elimination of flux residues still remaining on the circuit or component. The machines are traditionally open to ambient air atmosphere.

Among the problems encountered by the users of such machines, the following may be quoted:

the formation of oxide layers (known as dross) on the surface of the solder bath as a result of its exposure to ambient air, leading to a not inconsiderable loss of solder and the need for regular cleaning of the bath. A medium sized machine is likely to produce up to 1 kg of dross per hour of service.

the second problem is connected with the cleaning operation after soldering. Within the framework of the "Montreal protocol", these solvents are subject to extremely strict regulations, and in some instances even subject to a pure and simple ban according to countries.

As a solution to these dross-formation and cleaning problems, a nitrogen cover has been proposed, at least above the solder bath, though in some cases throughout the rest of the machine, this being combined with the use of low activity flux leaving a minimal level of residue on the circuits, thus allowing the subsequent cleaning operation to be completely dispensed with, the nitrogen cover above the bath also greatly reducing the oxidation process of the solder bath.

It was thus deemed important to achieve a gas injection allowing the best compromise of performance and cost-effectiveness, between the residual level of oxygen achieved at least above the solder bath, of the gas consumption and of the machine production rate involving board input and output at a specific rate, the board input/output movements obviously being a source of pollution of the atmosphere due to air intake.

Machines made fully inert have thus appeared, designed from the start as a sealed tunnel, but also hood systems allowing a nitrogen cover to be provided for existing (open-bath) machines (retrofitting), at least for the solder bath, but also at times over part of the pre-heat zone and in the cooling zone downstream from the bath.

Performances claimed for the two types of system show that the more the cover is restricted in length (for instance exclusively limited to the solder bath), the more difficult it is to maintain in the hood a reasonable amount of nitrogen flow, while achieving very low residual oxygen concentrations (for instance 10 ppm of residual oxygen or less). A "short" system compared with the machine length, will effectively accommodate with greater difficulty the air intakes connected with board input/output, hence the need to maintain a high nitrogen flow.

In certain machines, atmospheres made inert by flow rates of the order of 50 or 60 $m^3$/hour have appeared, often incompatible with the user's economic constraints (and the balance sheet).

Such mediocre performances are very clearly associated with imperfect and non-optimised control over the manner whereby gas is injected into the hoods.

In that context, the applicant proposes in U.S. Pat. No. 5,161,727, an inert-rendering arrangement comprising a set of hoods defining at least at the level of the solder bath, an internal space separated from the surrounding atmosphere by means of seals, gas injection ducts opening onto the upper part of hoods and fitted with diffuser means.

SUMMARY OF THE INVENTION

The purpose of the present invention is to suggest an improved gas injection arrangement (or apparatus), allowing by a simple and efficient design to obtain an excellent compromise between the injected gas flow rate and the achieved residual oxygen concentration, while maintaining a high production rate (thereby of the components input/output level) for the relevant machine or continuous furnace.

To that end, with a view to avoiding any turbulence, source of air intakes into the machine or furnace, the applicant has emphasized the importance of implementing a gas injection distributed over the greatest possible area of the relevant confined space, with a good uniformity of gas speeds at the various points of the system (minimum standard deviation around an average speed), the average speed being advantageously maintained at a low level to avoid any turbulence.

The gas injection apparatus to form a controlled atmosphere in a confined space according to the invention, then comprises at least one assembly of ducts assembled in series and/or in parallel, of which at least a part of a duct comprises gas injection apertures, the assembly being supplied by at least one gas supply main, each supply main being connected to the assembly at the level of a primary connection node, the assembly being dimensioned while observing the following relationship:

$\Sigma\omega_i/\Sigma\phi_i \geq 1$, preferably $\geq 1.5$,
wherein $\Sigma\omega_i$ represents the sum of internal sections of the gas supply mains supplying the assembly and $\Sigma\phi_i$ represents the sum of the cross-sections of the gas injection apertures of the ducts assembly.

The term "confined space" according to the invention provides for a space defined for instance by a tunnel or group of hoods, isolating the space from the surrounding atmosphere but allowing components processed in the relevant machine or furnace to pass continuously. The invention is thus more particularly applicable to continuous machines or furnaces (wave soldering machines, continuous soldering furnaces, continuous heat treatment furnaces, etc.).

The term "node" according to the invention equally defines a simple connection point as well as a suitable arrangement (such as a buffer capacity unit) defining a volume, wherein is fed the gas brought by the main, whence it then goes to the subassembly of ducts with which it is connected.

The terms "ducts" and "mains" provides according to the invention for any type of gas transport or supply duct, whether in a straight line or as more usually the case in a curve, for instance of circular cross-section, though also square or rectangular, in widely varying materials according to the process gas (chemical compatibility), for instance stainless steel, copper, etc. The "gas injection apertures" provided in certain of these ducts or supply mains are also to be understood as holes allowing the gas to escape from the duct or main, generally in a transverse manner to its flow direction through the duct or main (according to the shape of the holes).

In the case of the apparatus consisting of a single duct with apertures, supplied with gas from one end, the relationship $\Sigma\omega_i/\Sigma\phi_i \geq 1$ takes into account a single $\omega_i$ representing the internal section of the duct itself and $\Sigma\phi_i$ representing the sum of the duct injection apertures sections, the "primary node" according to the invention then being an intermediate imaginary connection point between the end of the duct and the part of the duct having apertures.

The injected gas may be a neutral gas (such as nitrogen, argon or even helium) when an inert protective atmosphere is to be installed, just as well as an active gas such as for instance hydrogen or mixtures of inert gas and hydrogen, or also mixtures of inert gas and silane, when the atmosphere is intended to provide a function such as surface-cleaning, or even in the case of heat treatment atmospheres mixtures based on $H_2O$ or $CH_4$ or $N_2O$ or $CO$ or $CO_2$ or even $H_2O$ for instance.

According to one aspect of the invention, at least one gas supply main itself has gas injection apertures and the dimensions of the assembly then complies with the following relationship:

$\Sigma\omega_i/\Sigma\phi_i + \Sigma\alpha_i \geq 1$, preferably 1.5 wherein $\Sigma\omega_i$ represents the sum of internal cross-sections of the gas supply mains feeding the assembly, $\Sigma\omega_i$ represents the sum of cross-sections of the gas injection apertures of the ducts assembly and $\Sigma\alpha_i$ represents the sum of cross-sections of the injection apertures of the relevant supply mains having gas injection apertures.

According to another aspect of the invention, the gas supply mains feeding the assembly all originate from one upstream node, itself supplied with gas by a feed duct of internal section $\Omega$, the dimensions of this upstream node being such that: $\Omega/\Sigma\omega_i \geq 1$, preferably $\geq 1.5$ wherein $\Sigma\omega_i$ is the sum of internal cross-sections of the said supply mains.

In such a configuration, if one (or several) gas supply mains is/are also provided with gas injection apertures, the dimensions of the assembly observe the following relationship:

$\Omega/(\Sigma\phi_i + \Sigma\alpha_i) \geq 1$, preferably $\geq 1.5$ wherein $\Sigma\phi_i$ is the sum of cross-sections of the duct assembly gas injection apertures and $\Sigma\alpha_i$ represents the sum of cross-sections of the injection apertures of the relevant main(s) having gas injection apertures.

According to one of the embodiments of the invention, for each duct comprising gas injection apertures, the apertures are directed towards the upper part of the confined space.

According to one of the embodiments of the invention, the square or rectangular-section parts of duct comprising gas injection apertures consist of a non-perforated U-shaped lower part on which is mounted an inverted U-shaped perforated sheet.

According to another version of the invention, the assembly or assemblies forming the apparatus are included in a hood, located in the upper pan of the confined space, the hood comprising a diffuser structure in its lower part.

According to one embodiment of the invention, the diffuser consists of a perforated metal sheet or a plate made of porous material.

The voids percentage of the perforated sheet (i.e. the ratio of the total cross-section of holes in the sheet to the surface of the sheet) will then advantageously be lower than 40%, and preferably less than 20%.

A material withstanding the usual temperatures within the relevant confined space may be used advantageously for the perforated sheet, such as for instance stainless steel, Inconel, etc.. As far as the porous material diffuser is concerned, porous Inconel could be used for example, though certain ceramic materials also.

The invention also concerns a gas injection process to form a controlled atmosphere in a confined space, whereby the gas is injected through means such as the previously described apparatus or arrangement, the gas speed on exit from the gas injection apertures of the duct assembly or assemblies being greater than 0.5 m/sec, preferably above 1 m/sec.

The applicant has determined the tact that to obtain the best possible uniformity of speed ranges at the exit of the injection apparatus, and bearing in mind a flow rate supplied to the arrangement fixed by the characteristics of the confined space, it has proved useful not only to ensure dimensional arrangements with the application of the cross-section relationships according to the invention, but also to set up these dimensions in such a manner that the gas speed at the exit from the arrangement is low, though at least equal to a minimum speed limit, varying for each cross-section relationship. To achieve this speed limit, assuming given cross section relationships (i.e. an aperture area), that aperture area may be achieved for instance with a greater or lesser number of holes. In order to raise that speed above the given limit, it may eventually be useful to achieve that aperture area by reducing the number of injection apertures.

According to another aspect of the invention, the gas speed at the exit from each gas injection aperture of the duct assembl(y)ies is located within a field around a given average value, the limits of that field being no further than 5% beyond the average value.

According to another aspect of the invention, the Reynolds index of the gas flow at the exit from the assembly and/or from the diffuser, is equal to or lower than 2000, so as to achieve a flow rate as close as possible to the laminar flow regime (the Reynolds index being assessed by means of relationship V.D/v, wherein V represents the gas average speed at the injection aperture exit, D represents the aperture internal diameter and V is the kinetic viscosity of the relevant gas).

BRIEF DESCRIPTION OF THE DRAWINGS

Other properties and advantages of the present invention may be determined from the following description of implementation methods quoted as a non-restrictive example, compared with the appended drawings, wherein:

FIGS. 1 to 9 show schematic examples of arrangements allowing the implementation of the invention.

FIG. 10 is a cross-sectional diagram of a square cross-section duct of which the upper part consists of an inverted U-shaped perforated metal sheet.

FIG. 11 is a schematic perspective representation of a duct according to the invention, comprising an assembly of ducts arranged within a hood of which the lower part has a diffuser-like structure.

DETAILED DESCRIPTION OF THE INVENTION

The examples of arrangements in FIGS. 1 to 9 are represented schematically: for ease of representation, the relationships of the duct cross-sections and injection apertures are not shown to scale, the apertures being shown for instance as a number of simple dots. However these figures allow clear illustration of the concepts of "assembly", "primary node", "upstream node", "ducts with injection apertures" as well as of "supply main" as in the invention.

Figure 1:
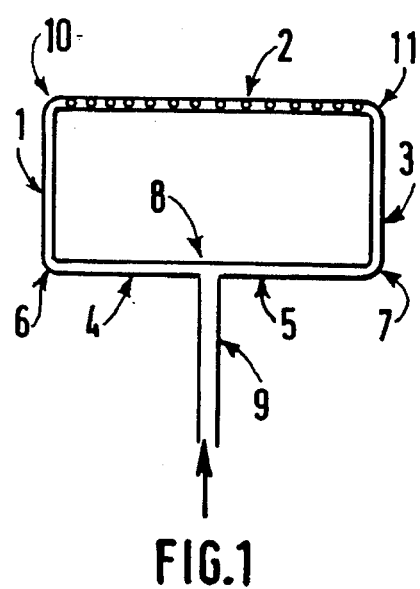

The example in FIG. 1 illustrates the case of an assembly of 4 ducts 1, 2, 3 and (4/5), supplied by a single supply main 9 at the level of a primary node 8. According to the invention this gives:

$\omega_9/\Sigma\phi_i \geq 1$ wherein $\omega_9$ represent the internal cross-section of the gas supply main feeding the assembly and $\Sigma\phi_i$ represents the sum of injection aperture cross-sections of the ducts assembly, effectively of duct 2.

According to the invention, it will be noted that the whole of FIG. 1 could be considered as consisting of 3 ducts 1, 2, 3 fitted in series, the assembly being supplied by two mains 4, 5 connected to the assembly at the level of two primary nodes 6 and 7. According to the invention this produces:

$\omega_4+\omega_5/\Sigma\phi_i \geq 1$ where $\omega_4$ represents the internal cross-section of the supply main 4, $\omega_5$ that of supply main 5 and $\Sigma\phi_i$ represents the sum of the cross-section of the injection apertures of the assembly (thus here of the duct 2).

One could also consider on this figure the presence of an upward node 8, where a feed duct 9 (of internal section $\Omega$) provides gas to both of the supply mains 4 and 5. This upward node is then dimensioned according to:

$\omega_4+\omega_5 \leq \Omega$

As will be clearly appreciated by the technician, the important point is not so much the configuration in which it is chosen to describe an arrangement (which may vary as illustrated in FIG. 1), but to apply for the selected configuration the rules of the dimensions according to the invention.

Figure 2:
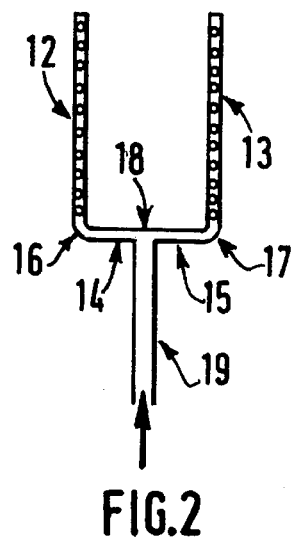

The example in FIG. 2 may be described as an assembly of two ducts 12, 13 fitted in parallel, supply by two supply mains 14 and 15 at the level of two primary nodes 16 and 17, the two supply mains 14 and 15 themselves being supplied at the level of an upstream node 18 by means of a feed duct 19 of internal cross-section $\Omega$ This then gives for the assembly as described:

$\omega_{14}+\omega_{15}/\Sigma\phi_i \geq 1$ where $\omega_{14}$ represents the internal cross-section of the supply main 14, $\omega_{15}$ that of the supply main 15 and $\Sigma\phi_1$ is the sum of the cross-sections of injection apertures of ducts 12 and 13.

This also gives at the level of the upstream node 18: $\omega_{14}+\omega_{15} \leq \Omega$.

As in FIG. 1, the assembly in FIG. 2 could also be described according to another configuration, such as an assembly of 3 ducts 12, 13 and (14, 15), supplied at a primary node 18 by a supply main 19. Once again, regardless of the selected configuration, the important point is to observe the dimensions rules according to the invention.

Having adopted that principle, the following figures are explained bearing one configuration in mind.

Figure 3:
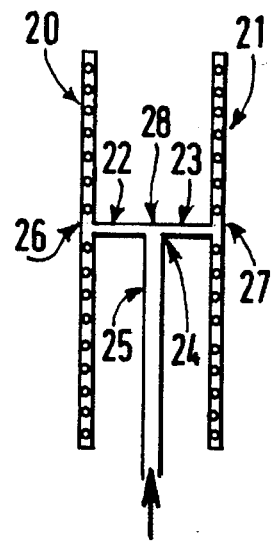

Thus, for the example shown in FIG. 3, the assembly comprises two ducts in parallel 20 and 21, supplied at the level of two primary nodes 26 and 27 by two supply mains 22 and 23, themselves supplied at an upstream node 24 by a feed duct 25. As before, the assembly could also be described by considering ducts 22 and 23 as forming the duct 28 supplied at the primary node 24.

Figure 4:
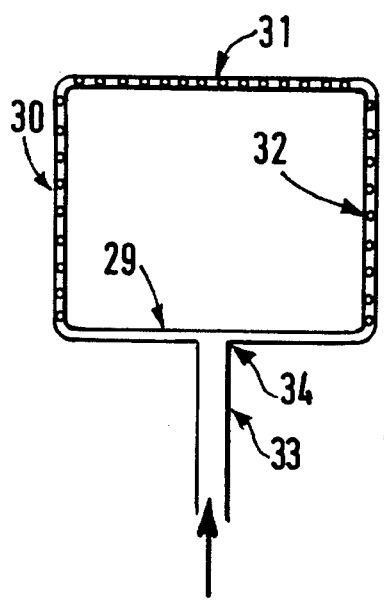

FIG. 4 illustrates an assembly consisting of four ducts in series 29, 30, 31, 32 supplied by a single supply main 33, at the level of a primary node 34 located on duct 29. The sum of the cross-section of apertures in this case is that of the injection apertures of ducts 30, 31 and 32.

In the schematic example 5, the assembly consists of 4 ducts 35, 36, 37, 38 forming a loop, supplied at two primary nodes 39, 40 by two supply mains 41 and 42, extending in each case from the primary node (39 or 40) to an upstream node 43 at which ends a feed duct 44 of internal cross section $\Omega$.

It will be noted that the two ducts 41 and 42 have injection apertures, following the implementation mode as shown. The dimensions of the system then comply with the following relationships:

$\Omega/(\Sigma\phi_i+\Sigma\alpha_i) \geq 1$ where $\Sigma\phi_i$ represents the sum of cross-sections of the injection apertures of the ducts assembly (hence of ducts 36 and 38) and $\Sigma\alpha_i$ represents the sum of cross-sections of the injection apertures of the supply mains having apertures (hence of supply mains 41 and 42).

Figure 5:
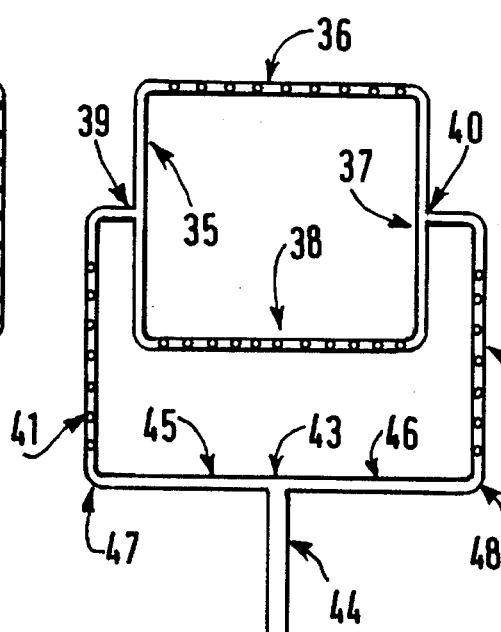

As will be clearly appreciated by the technician the assembly in FIG. 5 could also be described for instance as two curved ducts supplied as a primary node 43 by a supply main 44, the first consisting of ducts 35, 36, 37 and 38 and the second consisting of ducts 41, 42 and (45, 46).

Figure 6:
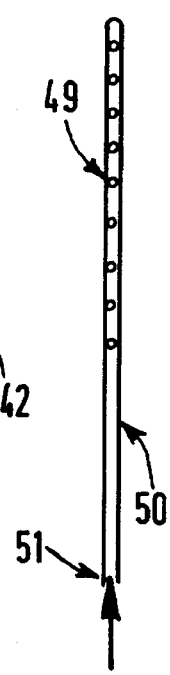

Looking at FIG. 6, this represents the simple case of a single duct 49 having injection apertures. As stated above, the application in this instance of the dimensions rules in accordance with the invention leads to the following relationship: $\omega/\Sigma\phi_i \leq 1$, where $\omega$ represents the internal cross-section of duct 49 and $\Sigma\phi_i$ represents the sum of cross-sections of the duct injection apertures, the "primary node" 50 according to the invention eventually being represented for instance by an "imaginary" intermediate connecting point between the non-perforated end 51 of the duct and the part of the duct having injection apertures.

In FIG. 7 there is an example of an assembly of four ducts 52, 53, 54, 55 the assembly being supplied at the level of two primary nodes 58, 59 by means of two supply mains 56 and 57, this arrangement example being without upstream node.

The example in FIG. 8 illustrates the case of a closed curve assembly 60 (for instance a circle) with injection apertures along the top, supplied at the level of two primary nodes 61 and 62 by two supply mains 63 and 64, extending respectively from an upstream node 65 to the corresponding primary node, the supply mains in turn being supplied at the upstream node level by a feed duct 66. The sizes of the assembly are then defined very largely as described so far ($\Omega/\Sigma\phi_i \geq 1$, where $\Sigma\phi_i$ represents the sum of sections of injection apertures in the assembly of ducts, i.e. of the loop).

FIG. 9 illustrates the case of an arrangement close to that illustrated in FIG. 5, but this time wherein two gas supply mains 73, 74 connected to the assembly of ducts (67, 68, 69, 70) at the level of nodes 71 and 72, do not have gas injection apertures.

FIG. 10 is a schematic illustration of a cross-section of a square (or rectangular) main or duct for which injection is effected by way of an inverted U-shaped perforated metal sheet 76, located at the top of the duct or main. As already stated, assessment of the sum of cross-sections of injection apertures would then be effected by way of the sum of holes in the sheet metal length forming that duct.

In FIG. 11 an injection arrangement diagram designed for implementation of the invention is shown, consisting of an assembly of ducts 77 such as that shown in FIG. 9 (simply shown here in broken lines) located within a hood 78 of which the lower part 79 consist of a diffuser structure according to the part diagram in the corner 80 of the hood.

An arrangement such as that shown in connection with FIG. 6 was tested for a first example of implementation, in the following conditions: the duct has an internal diameter of 10 mm, and comprises 7 circular holes (or apertures) of 2 mm diameter, at 50 mm regular intervals. The duct is fed with a gas input of 0.27 Nm$^3$/h (nitrogen in this instance). Gas discharge speed was measured at each hole under stable conditions, an anemometer being located 40 mm above the hole.

This configuration thus involved:

.$\omega$(duct cross-section)=0.28 cm$^2$

.$\Sigma\phi_i$ (sum of holes cross-sections)=0.22 cm$^2$

Hence a relationship of $\omega/\Sigma\phi_i$=3.5 therefore much greater than 1, also greater than 1.5 effectively.

Results obtained under these conditions showed excellent uniformity of gas exit speeds from the holes with an average speed value equal to 4.30 m/sec, and a 0.16 m/sec standard deviation around that average value for all the holes.

The same test was made with a flow rate of 0.20 Nm$^3$/h: this gave an average speed value of 3.04 m/sec with a small standard deviation around that average value of 0.06 m/sec.

There is consequently a very low spread in both cases.

The same type of arrangement as in FIG. 6 was used in a second example for comparative purposes in the following configuration: the duct also with an internal diameter of 10 mm, also had 7 apertures, but of 5.3 mm in diameter equally spaced at 50 mm.

In this configuration we have:

.$\omega$ (duct cross-section)=0.78 cm$^2$

.$\Sigma\phi_i$ (sum of holes cross-sections) $\omega/\Sigma\phi_i$=1.54 cm$^2$ hence a relationship of $\omega/\Sigma\phi_i$=0.5 therefore lower than 1.

With the same procedure as that outlined in the framework of the first example, a first flow-rate of 0.26 Nm$^3$/h was used. For that first flow rate value the results obtained show an average gas exit speed of 0.75 m/sec from the 7 holes, with a standard deviation of 0.13 m/sec around that average value (thus close to 18% of the average value) representing a marked spread.

Application of a flow rate of 0.2 Nm$^3$/h also showed poor values since an average gas flow speed of 0.50 m/sec was measured, with a standard deviation of 0.12 m/sec, hence a spread of nearly 24%.

These poor results are connected with the value of the cross-sections relationship.

The following two examples (third and fourth example) were implemented to illustrate the problem of the minimum speed best observed at the assembly exit. As shown in the previous examples, when the assembly dimensions rules according to the invention are observed, there is a significant improvement in terms of uniformity of the range of flow speeds at the exit from the assembly of ducts. In calculating the dimensions, it is nevertheless advantageous to achieve a cross-section relationship giving a minimum gas speed at the exit from the injection apertures, by adjusting for a given cross-section relationship, namely for a given area of holes, the number of holes representing that area, any reduction in the number of holes involving an increased speed (the area of each hole being slightly increased to maintain a constant relationship).

To simulate this problem in a simple manner, the following two situations were tested:

EXAMPLE 3 still with a 10 mm internal diameter the duct has 5 holes, but of 3.3 mm diameter, and equally spaced at 50 mm.

In this configuration:

.$\omega$(duct cross-section)=0.78 cm$^2$ $\Sigma\phi_i$(sum of holes cross-sections)=0.43 cm$^2$ hence a relationship of $\omega/\Sigma\phi_i$=1.8 hence greater than 1

A flow rate of 0.066 Nm$^3$/h of nitrogen was applied to the duct inlet, giving rise to an average gas speed of 0.45 m/sec at the holes exits, with a standard deviation of 0.03 Nm$^3$/h around that value, hence a spread of approximately 7%.

EXAMPLE 4 the same duct as in example 3 is used, but increasing the flow rate at the duct inlet to 0.264 Nm$^3$/h of nitrogen. Results obtained showed an average gas speed of 2.41 m/sec at hole exits, with a standard deviation of 0.04 m/sec around that value, hence a spread of less than 2% in relation to the average value.

The numerous experiments carried out by the applicant (by varying: cross-section relationships at primary nodes, gas exit speed by adjusting the input flow or the number of holes) have clearly demonstrated that the limit speed varies according to the cross-section relationships under consideration.

In a 5th example of implementation of the invention, an arrangement such as that shown with reference to FIG. 11 (involving an assembly of ducts such as in FIG. 9 within a hood), was tested for the purpose of rendering inert the brazing zone in a wave soldering machine.

The hood is located above the preheat zone, as well as above the brazing zone, and part of the machine cooling zone. Each hood comprises a duct assembly as shown in FIG. 9.

Each assembly of ducts observes a dimensions relationship of 2.8 (between the feed duct and the sum of injection apertures cross-sections). The diffuser at the lower level of the hood is provided by a grid with a void percentage of 38%.

Such an arrangement supplied (for the total of three zones) with a total nitrogen input of 24 Nm$^3$/h, allowed the oxygen content above the solder bath to be permanently maintained at less than 10 ppm, regardless of the machine production rate (as for example in circuits located every 5 cm on the conveyor and moving at 1.3 m/mn).

This implementation example shows that for a particularly low (i.e. reasonable) overall flow rate, it was possible by observing the dimensions rules at the various points of the arrangement, to ensure a stable atmosphere in the machine, distributed as uniformly as possible in each of the hood covered zones, with a speed range allowing reduction to a minimum of turbulence and thereby air inputs during the boards entries/exits from the machine.

Such a nitrogen cover in the machine allows a very significant reduction of dross formation over the solder bath (less than 30 g of dross per hour of machine operation under nitrogen cover, against more than 1 kg/hour during traditional operation in air), as well as combined operation with "very low residue" fluxes, thus allowing the machine user to achieve no-clean conditions for the circuits after brazing.

Although the present invention has been described in conjunction with particular implementation modes, it is in no way restricted thereby, and on the contrary is subject to modifications and variations which may present themselves to the skilled technician within the framework of the claims hereinafter.

I claim:

1. Gas injection apparatus to form a controlled atmosphere in a confined space, comprising at least one assembly of ducts installed in series and/or parallel, of which at least a portion of duct has gas injection apertures, said assembly being supplied by a least one gas supply main, each main being connected to the assembly at a primary connection node, the dimensions of the assembly observing the following relationship:

$\Sigma\omega_i/\Sigma\phi_i \geq 1$ wherein $\Sigma\omega_i$ represents the sum of internal cross-sections of the gas supply mains feeding the assembly and $\Sigma\phi_i$ represents the sum of the cross-sections of the gas injection apertures of the assembly of ducts.

2. Gas injection apparatus according to claim 1, wherein the dimensions of the assembly observe the following relationship $\Sigma\omega_i/\Sigma\phi_i \geq 1.5$.

3. Apparatus according to claim 1, wherein the gas supply mains to the assembly all originate from an upstream node which is supplied with gas by a feed duct of internal cross-section $\Omega$, the dimensions of the upstream node being such that:

$\Omega/\Sigma\omega_i \geq 1$;

wherein $\Sigma\omega_i$ is the sum of internal cross-sections of the gas supply mains.

4. Apparatus according to claim 3, wherein the dimensions of the upstream node are such that:

$\Omega/\Sigma\omega_i \geq 1.5$.

5. Apparatus according to claim 3, wherein at least one of the gas supply mains itself has gas injection apertures and the dimensions of the assembly observe the following relationship:

$\Omega/(\Sigma\phi_i+\Sigma\alpha_i) \geq 1$;

wherein $\Sigma\phi_i$ represents the sum of cross-sections of the injection apertures of the assembly of ducts, $\Sigma\alpha_i$ represents the sum of cross-sections of the injection apertures of the relevant supply main which has gas injection apertures and $\Omega$ is the internal cross-section of the feed duct.

6. Apparatus according to claim 5, wherein the dimensions of the assembly observe the following relationship:

$\Omega/(\Sigma\phi_i+\Sigma\alpha_i) \geq 1.5$.

7. Apparatus according to claim 1, wherein at least one of the gas supply mains itself has gas injection apertures and the dimensions of the assembly observe the following relationship:

$\Sigma\omega_i/(\Sigma\phi_i+\Sigma\alpha_i) \geq 1$ wherein $\Sigma\omega_i$ represents the sum of internal cross-sections of the gas supply mains feeding the assembly, $\Sigma\phi_i$ represents the sum of cross-sections of the gas injection apertures of the assembly of ducts, and $\Sigma\alpha_i$ represents the sum of cross-sections of the injection apertures of the relevant gas supply main which has gas injection apertures 8. Apparatus according to claim 7, wherein the dimensions of the assembly observe the following relationship:

$\Sigma\omega_i/(\Sigma\phi_i+\Sigma\alpha_i) \geq 1.5$.

9. Apparatus according to claim 1, wherein each duct is a circular section tube.

10. Apparatus according to claim 1, wherein at least one of the portions of duct is a square or rectangular cross-section tube.

11. Apparatus according to claim 10, wherein the portions of the square or rectangular cross-section duct having gas injection apertures comprise a lower U-shaped non-perforated part on which is mounted a perforated metal sheet in the form of an inverted U.

12. Apparatus according to claim 1, wherein for each duct having gas injection apertures, the apertures are directed towards an upper part of the confined space.

13. Apparatus according to claim 1, wherein said at least one assembly is included in a hood, located in an upper part of the confined space, the hood having a diffuser in its lower part.

14. Apparatus according to claim 13, wherein the diffuser comprises a perforated metal sheet.

15. Apparatus according to claim 14, wherein the void percentage of the perforated metal sheet is less than 40%.

16. Apparatus according to claim 15, wherein the void percentage of the perforated metal sheet is less than 20%.

17. Apparatus according to claim 13, wherein the diffuser comprises a plate made of porous material.

18. Gas injection process to form a controlled atmosphere in a confined space, comprising injecting the gas through an apparatus as claimed in claim 1, wherein the gas flow speed at the exit from the gas injection apertures of said at least one assembly of ducts is greater than 0.5 m/sec.

19. Gas injection process according to claim 18, wherein the gas flow speed at the exit from the gas injection apertures of said at least one assembly of duct is greater than 1 m/sec.

20. Process according to claim 18, wherein the gas speed at the exit from each of the gas injection apertures of said at least one assembly of duct, is located within an interval around a predetermined average value, the distance of the limits of said interval being no more than 5% beyond the average value.

21. Process according to claim 18, wherein the Reynolds index of the gas flow at the exit from the assembly is less than or equal to 2,000.

* * * * *